United States Patent
Dezfulian

(10) Patent No.: US 11,934,051 B2
(45) Date of Patent: *Mar. 19, 2024

(54) SLOTTED SHIELDS FOR USE WITH AN ELECTRO-OPTICAL PHASE SHIFTER

(71) Applicant: GLOBALFOUNDRIES U.S. Inc., Santa Clara, CA (US)

(72) Inventor: Kevin K. Dezfulian, Arlington, VA (US)

(73) Assignee: GlobalFoundries U.S. Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/125,165

(22) Filed: Mar. 23, 2023

(65) Prior Publication Data

US 2023/0229028 A1    Jul. 20, 2023

Related U.S. Application Data

(63) Continuation of application No. 17/223,449, filed on Apr. 6, 2021, now Pat. No. 11,644,696.

(51) Int. Cl.
*G02F 1/025* (2006.01)

(52) U.S. Cl.
CPC .......... *G02F 1/025* (2013.01); *G02F 2203/50* (2013.01)

(58) Field of Classification Search
CPC .......... G02F 1/025; G02F 1/035; G02F 1/065; G02F 1/225; G02F 2201/12; G02F 2201/122; G02F 2201/128
USPC ........................................................ 385/1–3
See application file for complete search history.

(56) References Cited

U.S. PATENT DOCUMENTS

| | | | |
|---|---|---|---|
| 5,220,627 A | * | 6/1993 | Kawano ............. G02F 1/2255 385/2 |
| 8,028,406 B2 | | 10/2011 | Ding et al. |
| 9,087,840 B2 | | 7/2015 | Lin et al. |
| 2013/0154773 A1 | | 6/2013 | Siprak |
| 2016/0056115 A1 | | 2/2016 | Kunishima et al. |
| 2017/0365563 A1 | | 12/2017 | Chen et al. |
| 2019/0025615 A1 | | 1/2019 | Kawamura et al. |

(Continued)

OTHER PUBLICATIONS

T. S. D. Cheung et al., "On-chip Interconnect for mm-Wave Applications Using an All-Copper Technology and Wavelength Reduction," 2003 IEEE International Solid-State Circuits Conference, 2003. Digest of Technical Papers. ISSCC., San Francisco, CA, USA, 2003, pp. 396-501 vol.1.

(Continued)

*Primary Examiner* — Robert Tavlykaev
(74) *Attorney, Agent, or Firm* — Thompson Hine LLP; Anthony Canale

(57) ABSTRACT

Structures including an electro-optical phase shifter and methods of fabricating a structure including an electro-optical phase shifter. The structure includes a waveguide core on a semiconductor substrate, and an interconnect structure over the waveguide core and the semiconductor substrate. The waveguide core includes a phase shifter, and the interconnect structure includes a slotted shield and a transmission line coupled to the phase shifter. The slotted shield includes segments that are separated by slots. The slotted shield is positioned between the transmission line and the substrate.

20 Claims, 11 Drawing Sheets

(56) References Cited

U.S. PATENT DOCUMENTS

2021/0055581 A1     2/2021   Yan et al.
2022/0128843 A1     4/2022   Adams et al.

OTHER PUBLICATIONS

T. S. D. Cheung and J. R. Long, "Shielded Passive Devices for Silicon-Based Monolithic Microwave and Millimeter-Wave Integrated Circuits," in IEEE Journal of Solid-State Circuits, vol. 41, No. 5, pp. 1183-1200, May 2006.

R. R. Lahiji, L. P. B. Katehi and S. Mohammadi, "A Distributed Analogue CMOS Phase Shifter with Shielded Transmission Line," 2008 38th European Microwave Conference, Amsterdam, Netherlands, 2008, pp. 817-820.

A. Rofougaran, J. Y.—C. Chang, M. Rofougaran, S. Khorram and A. A. Abidi, "A 1 GHz CMOS RF Front-End IC with Wide Dynamic Range," ESSCIRC '95: Twenty-first European Solid-State Circuits Conference, Lille, France, 1995, pp. 250-253.

Taiwan Intellectual Property Office; Examination Report issued in Taiwanese Patent Application No. 111108000 dated Nov. 29, 2023; 11 pages.

\* cited by examiner

SLOTTED SHIELDS FOR USE WITH AN ELECTRO-OPTICAL PHASE SHIFTER

BACKGROUND

The present invention relates to photonics chips and, more specifically, to structures including an electro-optical phase shifter and methods of forming a structure including an electro-optical phase shifter.

Photonics chips are used in many applications and systems including, but not limited to, data communication systems and data computation systems. A photonics chip integrates optical components, such as waveguides, optical switches, optical power splitters, and directional couplers, and electronic components, such as field-effect transistors, into a unified platform. Among other factors, layout area, cost, and operational overhead may be reduced by the integration of both types of components on the same chip.

An electro-optical phase shifter can be used to modulate the phase of an optical signal propagating in a waveguide core. The phase is modulated under the control of a radiofrequency signal supplied from a transmission line. The electro-optical bandwidth of the phase shifter may be adversely impacted by the attenuation of the radiofrequency signal into the semiconductor substrate arising from the close proximity of the transmission line to the semiconductor substrate. In particular, propagation of the electric field lines into the semiconductor substrate is a principal source of signal attenuation.

Improved structures including an electro-optical phase shifter and methods of forming a structure including an electro-optical phase shifter are needed.

SUMMARY

In an embodiment of the invention, a structure includes a semiconductor substrate, a waveguide core on the semiconductor substrate, and an interconnect structure over the waveguide core and the semiconductor substrate. The waveguide core includes an electro-optical phase shifter, and the interconnect structure includes a slotted shield and a transmission line coupled to the phase shifter. The slotted shield includes a plurality of segments and a plurality of slots laterally separating the plurality of segments. The slotted shield is positioned between the transmission line and the semiconductor substrate.

In an embodiment of the invention, a method includes forming a waveguide core on a semiconductor substrate and forming a slotted shield in an interconnect structure that is located over the waveguide core and the semiconductor substrate. The waveguide core includes a phase shifter, and the slotted shield includes a plurality of segments and a plurality of slots laterally separating the plurality of segments. The method further includes forming a transmission line in the interconnect structure. The transmission line is coupled to the phase shifter, and the slotted shield is positioned between the transmission line and the semiconductor substrate.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
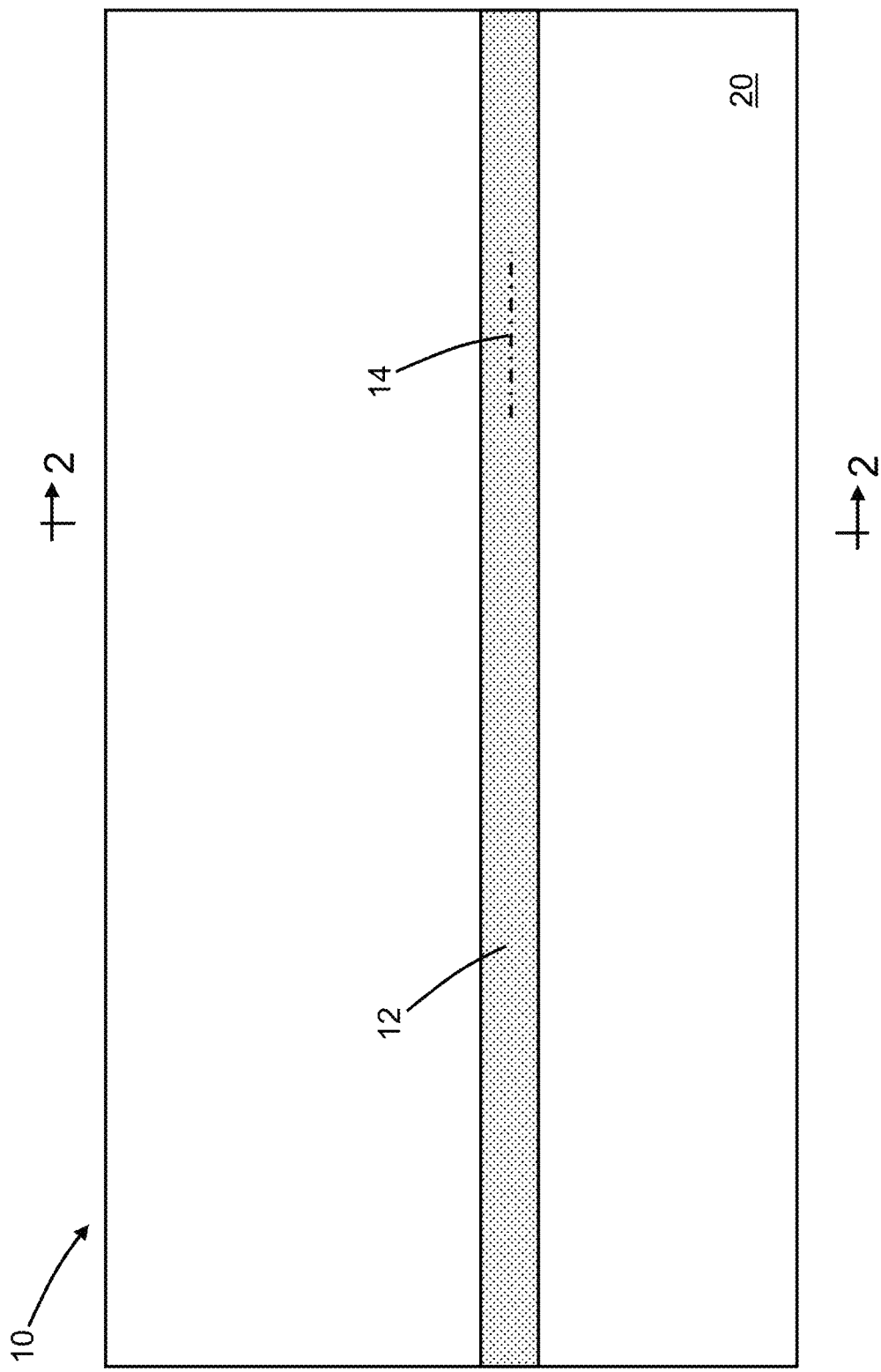
FIG. 1 is a top view of a structure at an initial fabrication stage of a processing method in accordance with embodiments of the invention.
Figure 2:
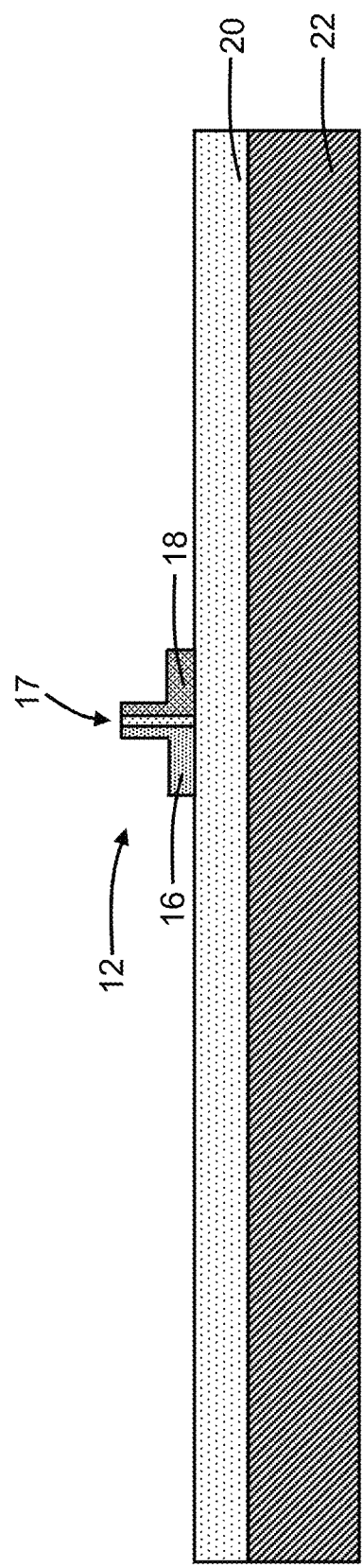
FIG. 2 is a cross-sectional view of the structure taken generally along line 2-2 in FIG. 1.

With reference to FIGS. 1, 2 and in accordance with embodiments of the invention, a structure 10 includes a waveguide core 12 that is aligned along a longitudinal axis 14 and an electro-optical phase shifter 17 that is associated with a portion of the waveguide core 12. In an embodiment, the electro-optical phase shifter 17 may be formed in a ribbed portion of the waveguide core 12. In an embodiment, the electro-optical phase shifter 17 may include a doped region 16 and a doped region 18 of opposite conductivity types separated by an intrinsic region to define a p-i-n junction. The doped region 16 may be formed in the ribbed portion of the waveguide core 12 by a masked ion implantation process, and the doped region 18 may be formed in the ribbed portion of the waveguide core 12 by a separate masked ion implantation process. In an embodiment, the semiconductor material of the doped region 16 may be doped with a p-type dopant (e.g., boron) that provides p-type electrical conductivity, and the semiconductor material of the doped region 18 may be doped with an n-type dopant (e.g., arsenic) that provides n-type electrical conductivity. Heavily-doped regions (not shown) of reduced electrical resistance may be formed in a portion of the doped region 16 and in a portion of the doped region 18, and used to establish electrical contacts for biasing the electro-optical phase shifter 17. In alternative embodiments, the electro-optical phase shifter 17 may have a junction of a different configuration.

The waveguide core 12 may be comprised of a semiconductor material, such as single-crystal silicon. In an embodiment, the semiconductor material may originate from a single-crystal device layer of a silicon-on-insulator (SOI) substrate that further includes a dielectric layer 20 provided by a buried oxide layer and a semiconductor substrate 22 comprised of a semiconductor material, such as single-crystal silicon. The waveguide core 12 may be patterned from the device layer by lithography and etching processes during front-end-of-line processing. In an embodiment, the waveguide core 12 may directly contact the dielectric layer 20. In an embodiment, the waveguide core 12 may be indirectly arranged on the semiconductor substrate 22 with the dielectric layer 20 intervening between the waveguide core 12 and the semiconductor substrate 22.

Figure 3:
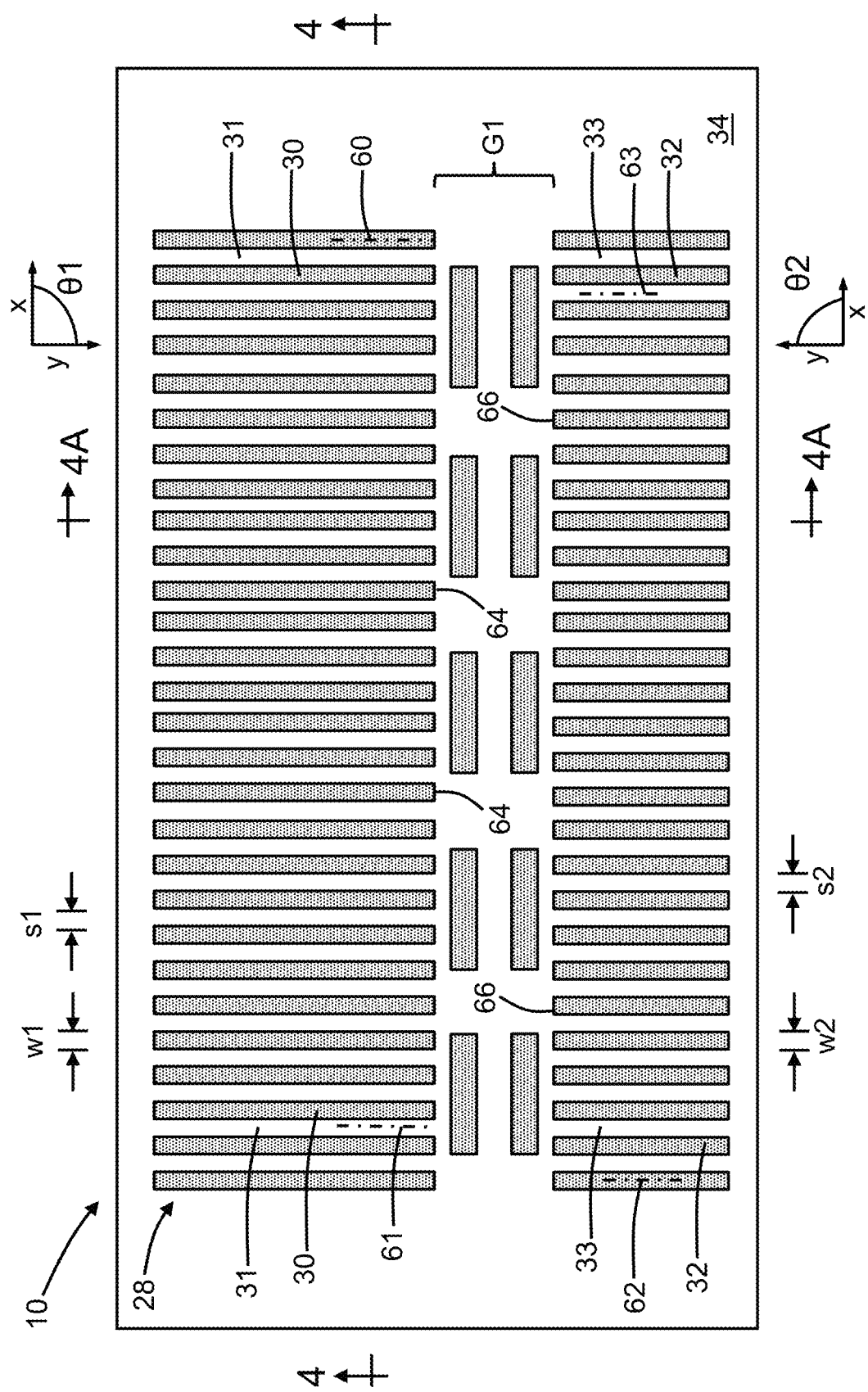
FIG. 3 is a top view of the structure at a fabrication stage subsequent to FIG. 1.
Figure 4:
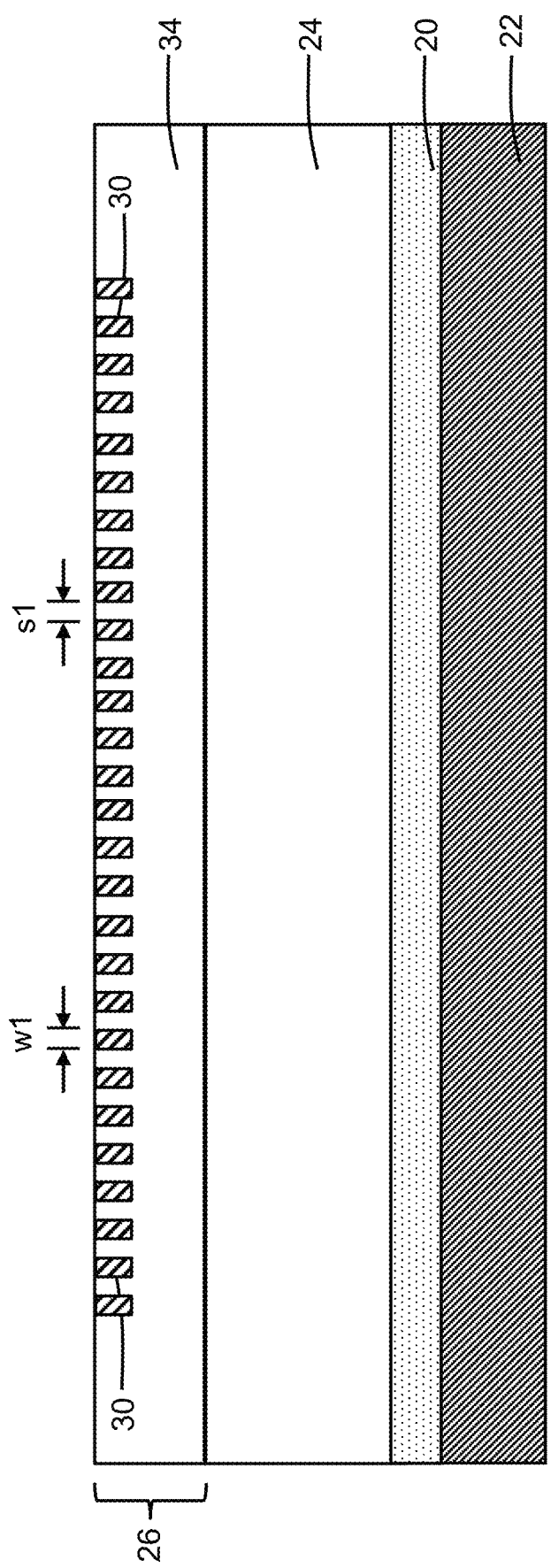
FIG. 4 is a cross-sectional view of the structure taken generally along line 4-4 in FIG. 3.
Figure 4A:
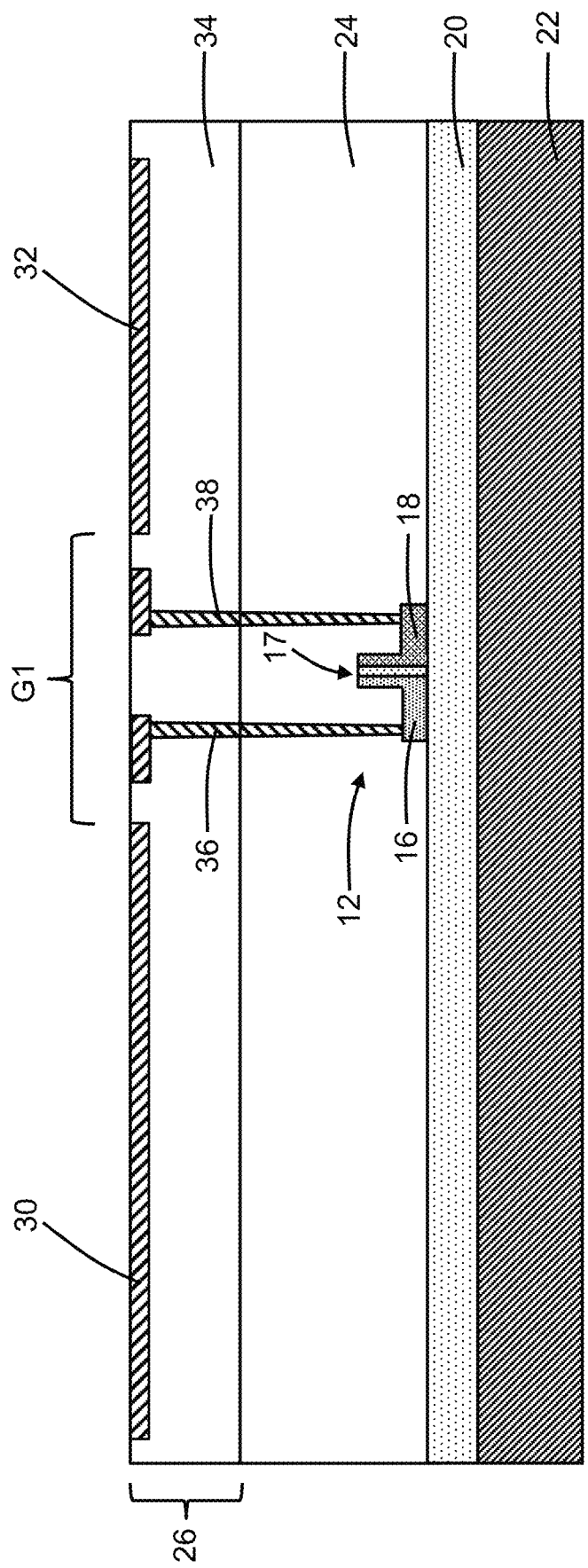
FIG. 4A is a cross-sectional view of the structure taken generally along line 4A-4A in FIG. 3.

With reference to FIGS. 3, 4, 4A in which like reference numerals refer to like features in FIGS. 1, 2 and at a subsequent fabrication stage, an interconnect structure 26 is formed by middle-of-line and back-end-of-line processing over the dielectric layer 20. A dielectric layer 24 of the interconnect structure 26 may be formed over the waveguide core 12 and the dielectric layer 20. The dielectric layer 24 may be comprised of silicon dioxide that is deposited by chemical vapor deposition and planarized with chemical-mechanical polishing.

The interconnect structure 26 may include multiple wiring levels that may be formed over the dielectric layer 24 by deposition, polishing, lithography, and etching techniques characteristic of a damascene process. Specifically, for each wiring level, an interlayer dielectric layer may be deposited and patterned using lithography and etching processes to define trenches and via openings that are lined with a barrier layer (e.g., a bilayer of tantalum and tantalum nitride) and filled by a planarized conductor (e.g., copper or aluminum) to define lines and vias that connect the lines in different wiring levels. Each interlayer dielectric layer of the interconnect structure 26 may be comprised of an inorganic dielectric material, such as silicon dioxide or a low-k dielectric material, that is deposited by, for example, chemical vapor deposition.

A slotted shield 28 is formed in a wiring level of the interconnect structure 26 and is positioned over the waveguide core 12. In an embodiment, the slotted shield 28 may be formed in an interlayer dielectric layer 34 of a wiring level of the interconnect structure 26. In an embodiment, the wiring level containing the slotted shield 28 may be the closest of the wiring levels (i.e., the first metal wiring level) of the interconnect structure 26 to the waveguide core 12. The slotted shield 28 includes segments 30 that are disconnected and laterally spaced from each other by slots 31. The slotted shield 28 also includes segments 32 that are disconnected and laterally spaced from each other by slots 33.

The segments 30 are laterally spaced from the segments 32 by a gap G1 that is positioned over the waveguide core 12 and that overlaps with the waveguide core 12 and electro-optical phase shifter 17. More specifically, each segment 30 is terminated by an end surface 64 adjacent to one edge of the gap G1, and each segment 32 is terminated an end surface 66 adjacent to an opposite edge of the gap G1. The gap G1 is positioned laterally between the end surfaces 64 and the end surfaces 66. The width dimension of the gap G1, which may be measured between the edges, is selected to ensure that the segments 30, 32 do not overlap with the waveguide core 12. The gap G1, which may extend along the full length of the portion of the waveguide core 12 including the doped regions 16, 18, avoids placing the conductor of the slotted shield 28 directly over any portion of the waveguide core 12 in order to minimize adverse effects, such as optical reflection and absorption, on performance. In an embodiment, the gap G1 may have a uniform width dimension given by the distance between the end surfaces 64, 66.

The segments 30, 32 may be comprised of the conductor (e.g., copper) used to form the wiring level in which the slotted shield 28 is located. The segments 30 and the segments 32 may be arranged with a given pitch and, in an embodiment, the segments 30 and the segments 32 may be arranged with equal pitches. The segments 30 may have a line width w1, and pairs of the segments 30 may be spaced from each other by spaces or slots 31 to define a set of slotted lines. The segments 32 may have a line width w2, and pairs of the segments 32 may be spaced from each other by spaces or slots 33 to define another set of slotted lines. In an embodiment, the line widths w1, w2 of the segments 30, 32 may be on the order of one micron, and the width dimensions s1, s2 of the slots 31, 33 between the segments 30, 32 may be on the order of one micron. In an embodiment, the segments 30, 32 and slots 31, 33 may be drawn near ground-rule minimum line width and space width to optimize shielding at high frequencies, such as radiofrequencies. In an embodiment, the line widths w1, w2 may be less than or equal to 1 micron for operation at frequencies of 10 GHz to 100 GHz. The respective arrangements of the segments 30, 32 as disconnected slotted lines may be effective to suppress eddy currents during use.

Increasing the line widths w1, w2 of the segments 30, 32 may increase the shielding afforded by the slotted shield 28, while increasing the width dimensions s1, s2 of the slots 31, 33 may reduce the capacitance with other metallization in the interconnect structure 26. In an embodiment in which shielding and capacitance are balanced, the line width w1 of the segments 30 may be equal or substantially equal to the width dimension s1 of the slots 31 and the line width w2 of the segments 32 may equal or substantially equal to the width dimension s2 of the slots 33.

Each segment 30 of the slotted shield 28 is aligned along a longitudinal axis 60 and has a length in a direction transverse to its line width w1. Each slot 31 of the slotted shield 28 is aligned along a longitudinal axis 61 that may be aligned parallel to the longitudinal axis 60. In the representative embodiment, the segments 30 and slots 31 have rectangular shapes from a vertical perspective. In an embodiment, the longitudinal axis 60 of each segment 30 and the longitudinal axis 61 of each slot 31 may be aligned at an angle θ1 relative to an x-axis of an x-y coordinate frame. In the representative embodiment, the angle θ1 is equal to 90°. In a representative embodiment, the angle θ1 may be greater than or equal to 45°. In an embodiment, the angle θ1 may be within a range of 45° to 90°. An inclination angle θ1 equal to 90° may be effective to maximize the eddy current suppression.

Each segment 32 of the slotted shield 28 is aligned along a longitudinal axis 62 and has a length in a direction transverse to its line width w2. Each slot 33 of the slotted shield 28 is aligned along a longitudinal axis 63 that may be aligned parallel to the longitudinal axis 62. In the representative embodiment, the segments 32 and slots 33 have rectangular shapes from a vertical perspective. In an embodiment, the longitudinal axis 62 of each segment 32 and the longitudinal axis 63 of each slot 33 may be aligned at an angle θ2 relative to the x-axis of an x-y coordinate frame. In the representative embodiment, the angle θ2 is equal to 90°. In a representative embodiment, the angle θ2 may be greater than or equal to 45°. In an embodiment, the angle θ2 may be within a range of 45° to 90°. An inclination angle θ2 equal to 90° may be effective to maximize the eddy current suppression.

In an embodiment, the longitudinal axes 62 of the segments 32 may be respectively aligned with the longitudinal axes 60 of the segments 30. In an embodiment, the longitudinal axes 63 of the slots 33 may be respectively aligned with the longitudinal axes 61 of the slots 31.

Portions of interconnections 36, 38 to the doped regions 16, 18 are formed by middle-of-line and back-end-of-line processing in the dielectric layer 24 and the interlayer dielectric layer 34. The interconnections 36, 38 extend through the gap G1 that separates the segments 30 and the segments 32, and the interconnections 36, 38 include metal pads, which may be segmented, that are positioned within the gap G1 over the opposite side edges of the waveguide core 12.

Figure 5:
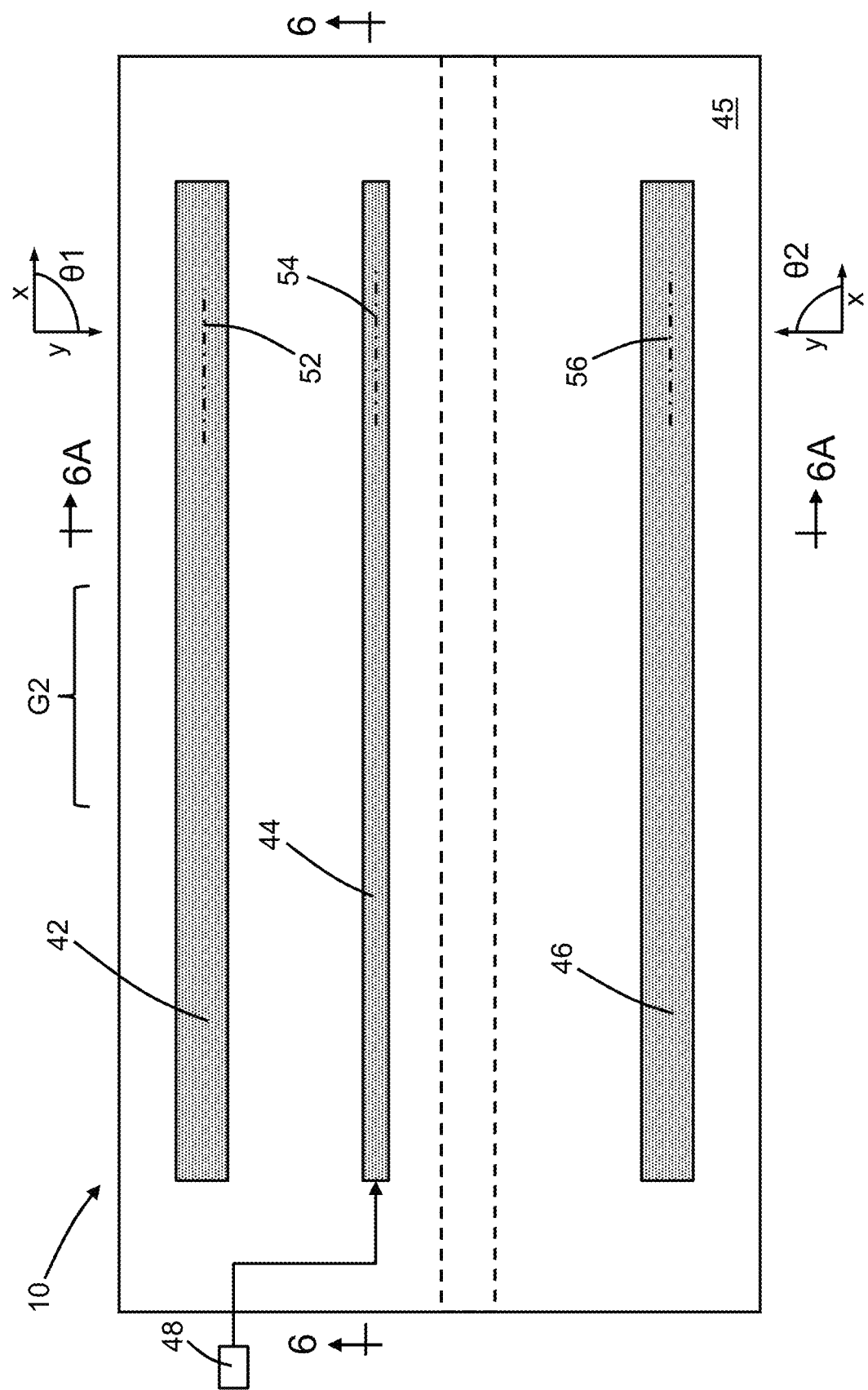
FIG. 5 is a top view of the structure at a fabrication stage subsequent to FIG. 3.
Figure 6:
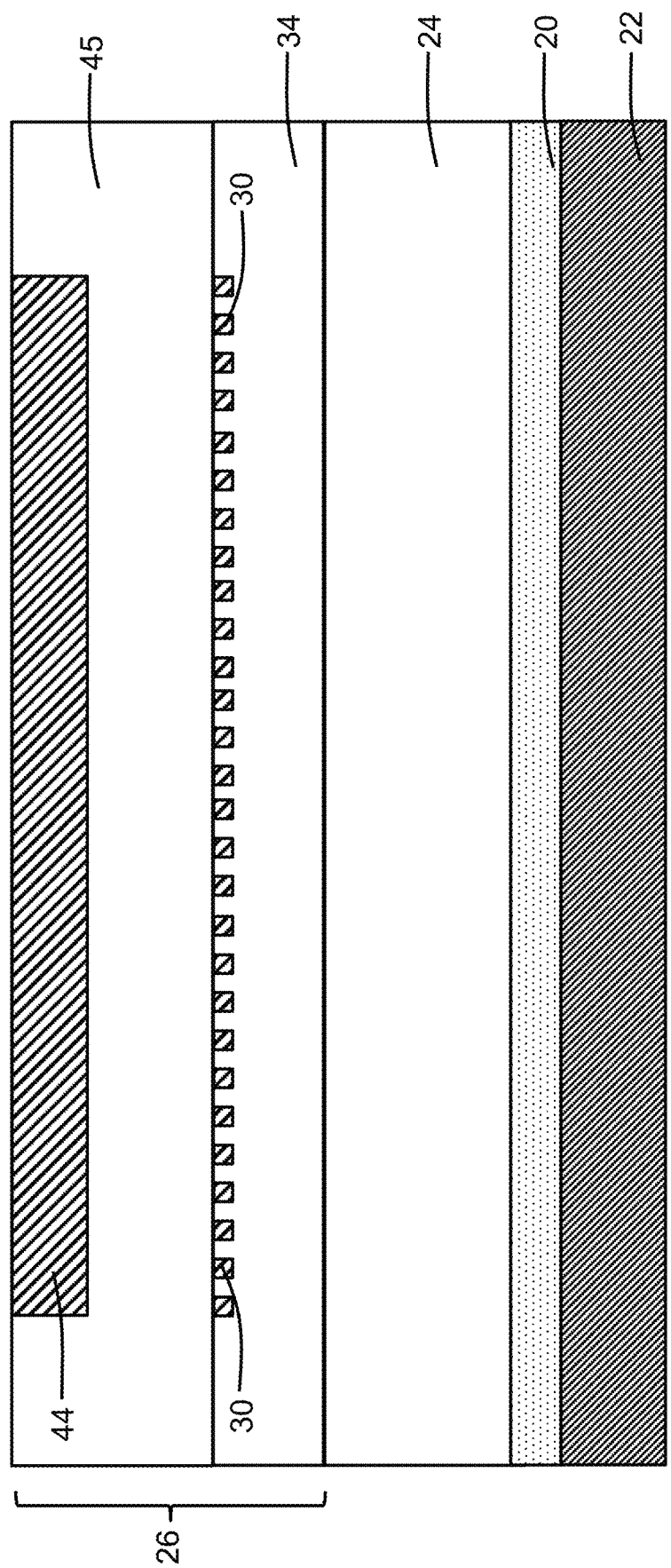
FIG. 6 is a cross-sectional view of the structure taken generally along line 6-6 in FIG. 5.
Figure 6A:
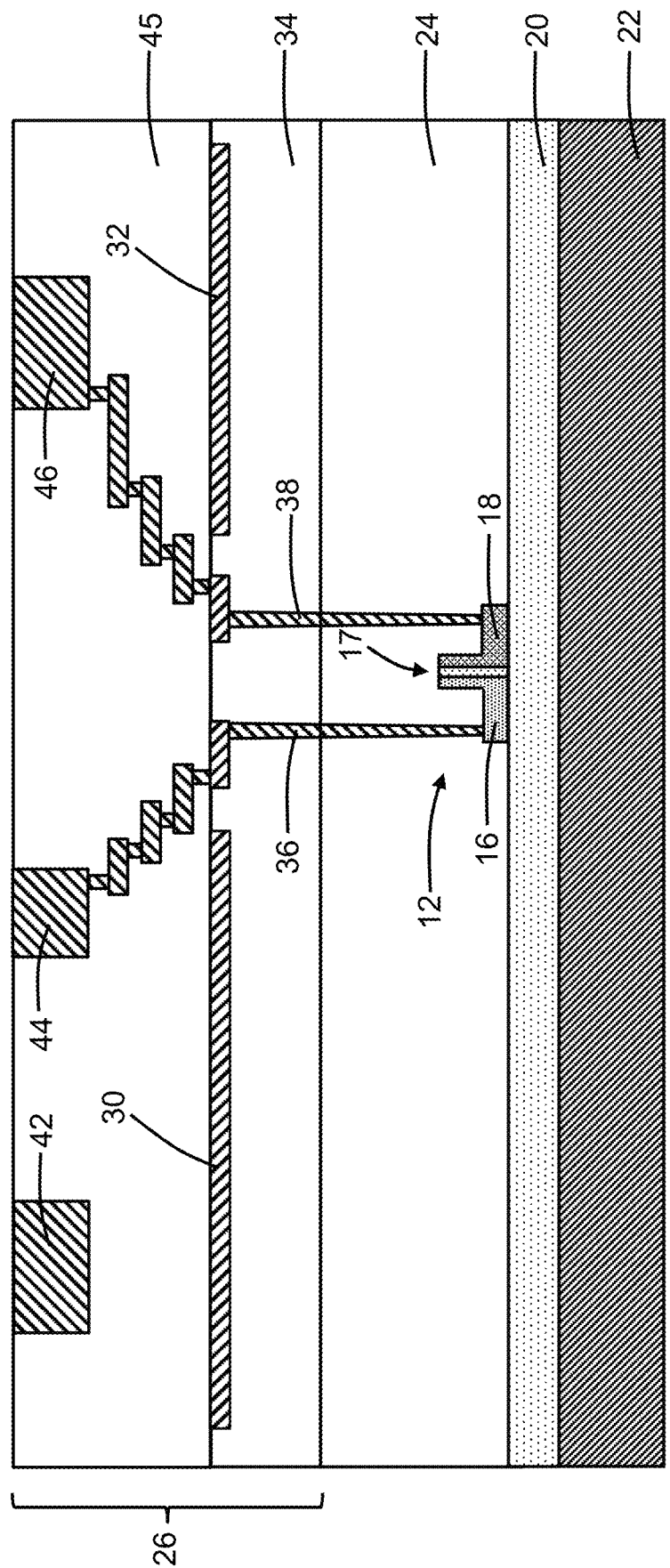
FIG. 6A is a cross-sectional view of the structure taken generally along line 6A-6A in FIG. 5.

With reference to FIGS. 5, 6, 6A in which like reference numerals refer to like features in FIGS. 3, 4, 4A and at a subsequent fabrication stage, additional wiring levels of the interconnect structure 26 are formed over the wiring level including the slotted shield 28. These additional wiring levels include multiple interlayer dielectric layers 45 that may be comprised of silicon dioxide, as well as transmission lines 42, 44, 46 that may be positioned in the topmost wiring level of the interconnect structure 26. The vias and lines in intervening multiple wiring levels between the slotted shield 28 and the transmission lines 44, 46 complete the interconnection 36 coupling the doped region 16 of the electro-optical phase shifter 17 to the transmission line 44 and the interconnection 38 coupling the doped region 18 of the electro-optical phase shifter 17 to the transmission line 46. The transmission lines 42, 46 may be coupled to a reference potential that is equal to earth ground, a reference potential that is greater than either the earth ground or a circuit reference ground, or a reference potential that is less than either the earth ground or the circuit reference ground.

The transmission line 44 provides a signal electrode that is coupled to a signal source, such as a driver 48. The driver 48 includes components, such as a driver amplifier, that are configured to supply data in the form of radiofrequency signals to the transmission line 42 for modulating the effective refractive index of the waveguide core 12. The radiofrequency signals propagate along the longitudinal axis 54 of the transmission line 44. The transmission line 44 is physically coupled by the interconnection 36 to the doped region 16 of the electro-optical phase shifter 17. The transmission line 46 is physically coupled by the interconnection 38 to the doped region 18 of the electro-optical phase shifter 17. The driver 48 provides a radiofrequency signal to the electro-optical phase shifter 17 that is effective to change the phase of the optical signals propagating in the waveguide core 12.

The interconnections 36, 38 in the wiring levels of the interconnect structure 26 may facilitate a lateral offset of the transmission lines 44, 46 relative to the waveguide core 12 and the gap G1 in the slotted shield 28 (FIG. 3). The segments 30 and slots 31 may be positioned between the transmission lines 42, 44 and the semiconductor substrate 22 such that the transmission lines 42, 44 each overlap with the segments 30 and slots 31. The segments 32 and slots 33 may be positioned between the transmission line 46 and the semiconductor substrate 22 such that the transmission line 46 overlaps with the segments 32 and slots 33. The segments 30, 32 and slots 31, 33 may reduce or prevent attenuation of the radiofrequency signals into the semiconductor substrate 22 arising from the close proximity of the transmission lines 42, 44, 46 to the semiconductor substrate 22.

The transmission line 42 may extend lengthwise in alignment with a longitudinal axis 52, the transmission lines 44 may extend lengthwise in alignment with a longitudinal axis 54, and the transmission line 46 may extend lengthwise in alignment with a longitudinal axis 56. In an embodiment, the longitudinal axes 52, 54, 56 may be aligned parallel to the longitudinal axis 14 of the waveguide core 12. In an embodiment, the longitudinal axes 52, 54, 56 may be aligned parallel to each other.

The longitudinal axis 60 of each segment 30 and the longitudinal axis 61 of each slot 31 of the slotted shield 28 (FIG. 4) may be aligned transverse to the longitudinal axes 52, 54 of the transmission lines 42, 44. The longitudinal axes 52, 54 of the transmission lines 42, 44 may be considered to be aligned with the x-axis of the x-y coordinate frame such that the longitudinal axes 60, 61 of the segments 30 and slots 31 are inclined at the angle θ1 relative to the longitudinal axes 52, 54 of the transmission lines 42, 44. In the representative embodiment, the longitudinal axes 60, 61 of the segments 30 and slots 31 are aligned perpendicular (i.e., θ1=90°) to the longitudinal axes 52, 54 of the transmission lines 42, 44. In an alternative embodiment, the longitudinal axes 60, 61 of the segments 30 and slots 31 may be aligned relative to the longitudinal axes 52, 54 of the transmission lines 42, 44 at an angle θ1 that is greater than or equal to 45°. In an alternative embodiment, the longitudinal axes 60, 61 of the segments 30 and slots 31 may be aligned relative to the longitudinal axes 52, 54 of the transmission lines 42, 44 at an angle θ1 that is within a range of 45° to 90°.

The longitudinal axis 62 of each segment 32 and the longitudinal axis 63 of each slot 33 of the slotted shield 28 (FIG. 4) may be aligned transverse to the longitudinal axis 56 of the transmission line 46. The longitudinal axis 56 of the transmission line 46 may be considered to be aligned with the x-axis of the x-y coordinate frame such that the longitudinal axes 62, 63 of the segments 32 and slots 33 are inclined at the angle θ1 relative to the longitudinal axis 56 of the transmission line 46. In the representative embodiment, the longitudinal axes 62, 63 of the segments 32 and slots 33 are aligned perpendicular (i.e., θ2=90°) to the longitudinal axis 56 of the transmission line 46. In an alternative embodiment, the longitudinal axes 62, 63 of the segments 32 and slots 33 may be aligned relative to longitudinal axis 56 of the transmission line 46 at an angle θ2 that is greater than or equal to 45°. In an alternative embodiment, the longitudinal axes 62, 63 of the segments 32 and slots 33 may be aligned relative to the longitudinal axis 56 of the transmission line 46 at an angle θ2 that is within a range of 45° to 90°.

The segments 30, 32 of the slotted shield 28 are positioned in the interconnect structure 26 such that contact with the other metallization in the interconnect structure 26 is avoided. The gap G1 between the segments 30, 32 provides a pathway through the slotted shield 28 for the interconnections 36, 38 between the transmission lines 44, 46 and the electro-optical phase shifter 17. In an embodiment, the slotted shield 28 may be placed in the first metal level of the interconnect structure 26 closest to the semiconductor substrate 22 to minimize the capacitance with the transmission lines 42, 44, 46. In an alternative embodiment, the slotted shield 28 may be positioned in one of the interlayer dielectric layers 45 of a wiring level above the first wiring level of the interconnect structure 26, and is not limited to being located in the wiring level closest to the semiconductor substrate 22.

The slotted shield 28 may be effective to reduce radiofrequency signal attenuation at a fixed impedance. The slotted shield 28 may provide a low cost solution in comparison with alternative approaches for reducing radiofrequency signal attenuation. The segments 30, 32 of the slotted shield 28 are separated from the transmission lines 42, 46 by the dielectric material of the interlayer dielectric layers 45 of the interconnect structure 26.

Figure 7:
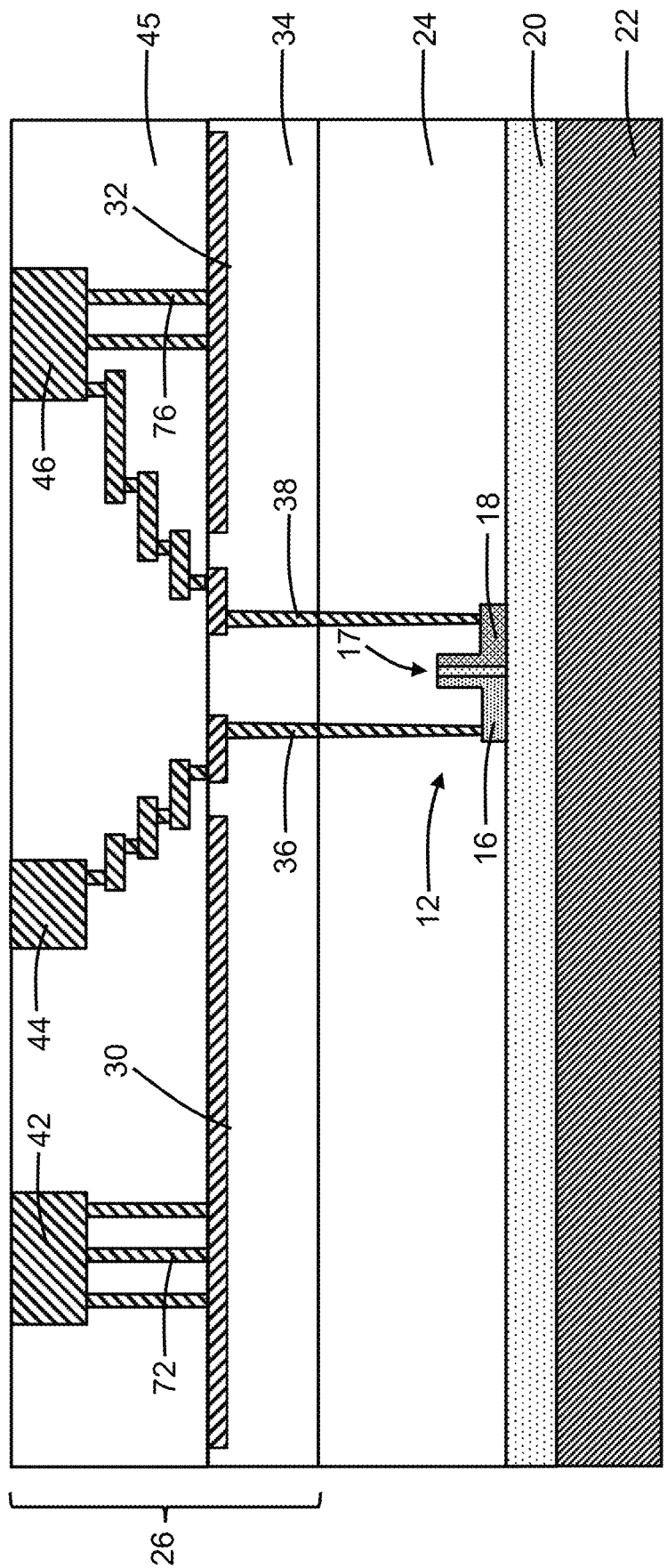
FIG. 7 is a cross-sectional view of a structure in accordance with alternative embodiments of the invention.

With reference to FIG. 7 and in accordance with alternative embodiments, the segments 30, 32 of the slotted shield 28 may be connected with the transmission lines 42, 46 by respective interconnections 72, 76 that are formed in the interlayer dielectric layers 45 of the interconnect structure 26. The interconnections 72 may be in the form of vias that provide physical and electrical connections between the segments 30 and the transmission line 42, and the interconnections 76 may be in the form of vias that provide physical and electrical connections between the segments 32 and the transmission line 46. In an embodiment, the interconnections 72 may directly connect the segments 30 with the transmission line 42 and the interconnections 76 may directly connect the segments 32 with the transmission line 46.

Figure 8:
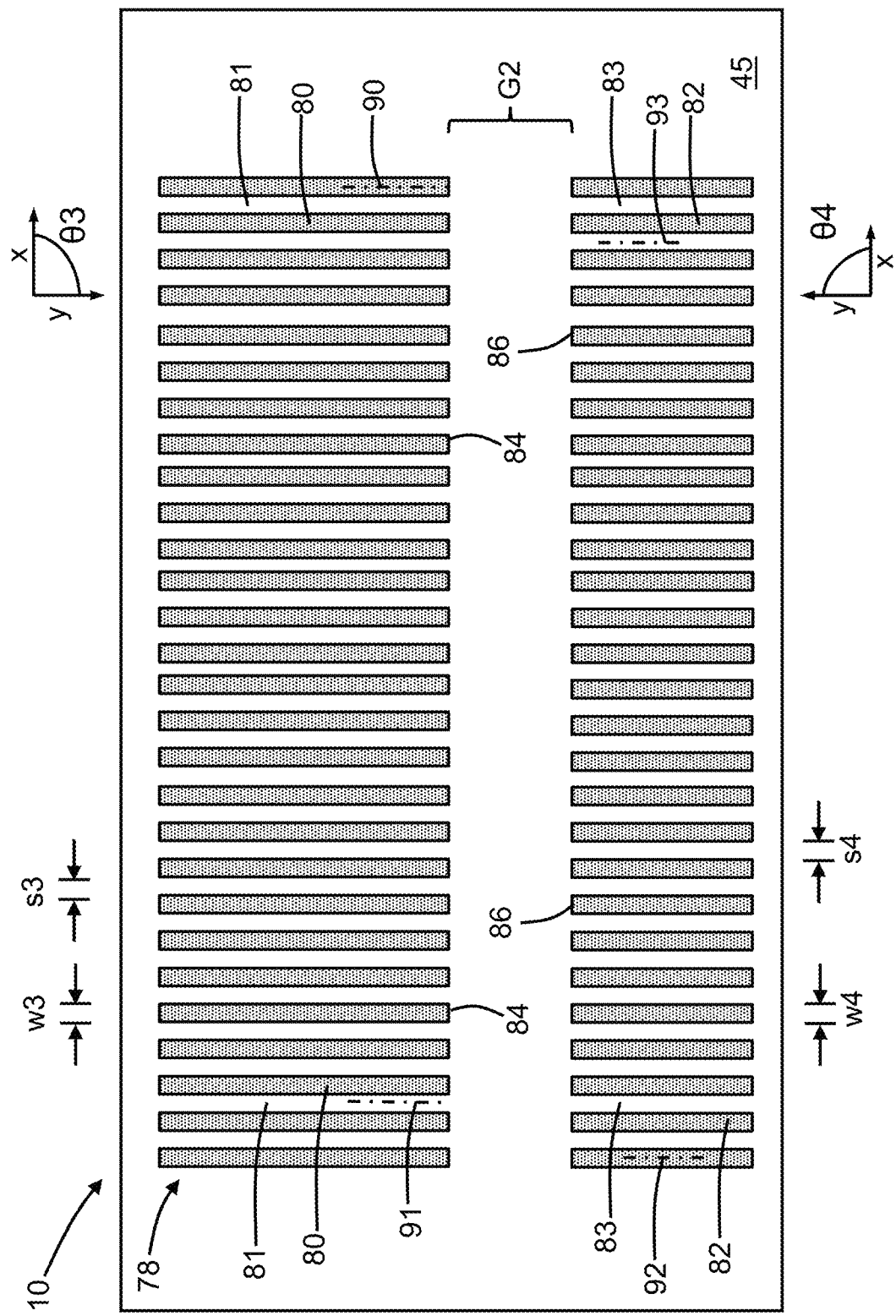
FIG. 8 is a top view of a structure in accordance with alternative embodiments of the invention.

With reference to FIG. 8 and in accordance with alternative embodiments, the structure 10 may include another slotted shield 78 that is similar to the slotted shield 28 and this is placed in a higher wiring level within the interconnect structure 26. The slotted shield 78 may include segments 80, 82 and slots 81, 83 that are similar to the segments 30, 32 and slots 31, 33 in arrangement and construction. The segments 80 are disconnected from each other by the slots 81, and the segments 82 that are disconnected from each other by the slots 83. The segments 80 are laterally spaced from the segments 82 by a gap G2 that is positioned over the waveguide core 12 and over the gap G1 in the slotted shield 28. The gap G2 overlaps with the waveguide core 12 and the gap G1 in the slotted shield 28. In an embodiment, the gap G2 may fully overlap with the gap G1 in the slotted shield 28.

Each segment 80 includes an end surface 84, and each segment 82 includes an end surface 86. The gap G2 is positioned laterally between the end surfaces 84 and the end surfaces 86, the end surfaces 84 terminate adjacent to one edge of the gap G2, and the end surfaces 86 terminate adjacent to an opposite edge of the gap G2. The width dimension of the gap G2 is selected to ensure that the segments 80, 82, in addition to the segments 30, 32, do not overlap with the waveguide core 12.

The segments 80, 82 may be comprised of the conductor (e.g., copper) used to form the wiring level in which the slotted shield 78 is located. The segments 80 may have a line width w3 and be spaced from each other by spaces or slots 81 of width dimension s3 to define a set of slotted lines. The segments 82 may have a line width w4 and be spaced from each other by spaces or slots 83 of width dimension s4 to define another set of slotted lines. The segments 80 may be staggered relative to the segments 30 of the underlying slotted shield 28 such that, for example, the segments 80 are positioned to overlap with the slots 31 between the segments 30. Similarly, the segments 82 may be staggered relative to the segments 32 of the underlying slotted shield 28 such that, for example, the segments 82 are positioned to overlap with the slots 33 between the segments 32. In an embodiment, the line width w3 of the segments 80 may be equal or substantially equal to the width dimension s3 of the slots 81 and the line width w4 of the segments 82 may equal or substantially equal to the width dimension s4 of the slots 83 to balance shielding and capacitance.

Each segment 80 has a longitudinal axis 90 and each slot 81 has a longitudinal axis 91 that are aligned transverse to the longitudinal axes 52, 54 of the transmission lines 42, 44. The longitudinal axes 52, 54 of the transmission lines 42, 44 may be considered to be aligned with the x-axis of the x-y coordinate frame such that the longitudinal axes 90, 91 of the segments 80 and slots 81 are inclined at an angle θ3 relative to the longitudinal axes 52, 54 of the transmission lines 42, 44. In the representative embodiment, the longitudinal axes 90, 91 of the segments 80 and slots 81 are aligned perpendicular (i.e., θ3=90°) to the longitudinal axes 52, 54 of the transmission lines 42, 44. In an alternative embodiment, the longitudinal axes 90, 91 of the segments 80 and slots 81 may be aligned relative to the longitudinal axes 52, 54 of the transmission lines 42, 44 at an angle θ3 that is greater than or equal to 45°. In an alternative embodiment, the longitudinal axes 90, 91 of the segments 80 and slots 81 may be aligned relative to the longitudinal axes 52, 54 of the transmission lines 42, 44 at an angle θ3 that is within a range of 45° to 90°.

Each segment 82 has a longitudinal axis 92 and each slot 83 has a longitudinal axis 93 that are aligned transverse to the longitudinal axis 56 of the transmission line 46. The longitudinal axis 56 of the transmission line 46 may be considered to be aligned with the x-axis of the x-y coordinate frame such that the longitudinal axes 92, 93 of the segments 82 and slots 83 are inclined at the angle θ4 relative to the longitudinal axis 56 of the transmission line 46. In the representative embodiment, the longitudinal axes 92, 93 of the segments 82 and slots 83 are aligned perpendicular (i.e., θ4=90°) to the longitudinal axis 56 of the transmission line 46. In an alternative embodiment, the longitudinal axes 92, 93 of the segments 82 and slots 83 may be aligned relative to longitudinal axis 56 of the transmission line 46 at an angle θ4 that is greater than or equal to 45°. In an alternative embodiment, the longitudinal axes 92, 93 of the segments 82 and slots 83 may be aligned relative to the longitudinal axis 56 of the transmission line 46 at an angle θ4 that is within a range of 45° to 90°.

Figure 9:
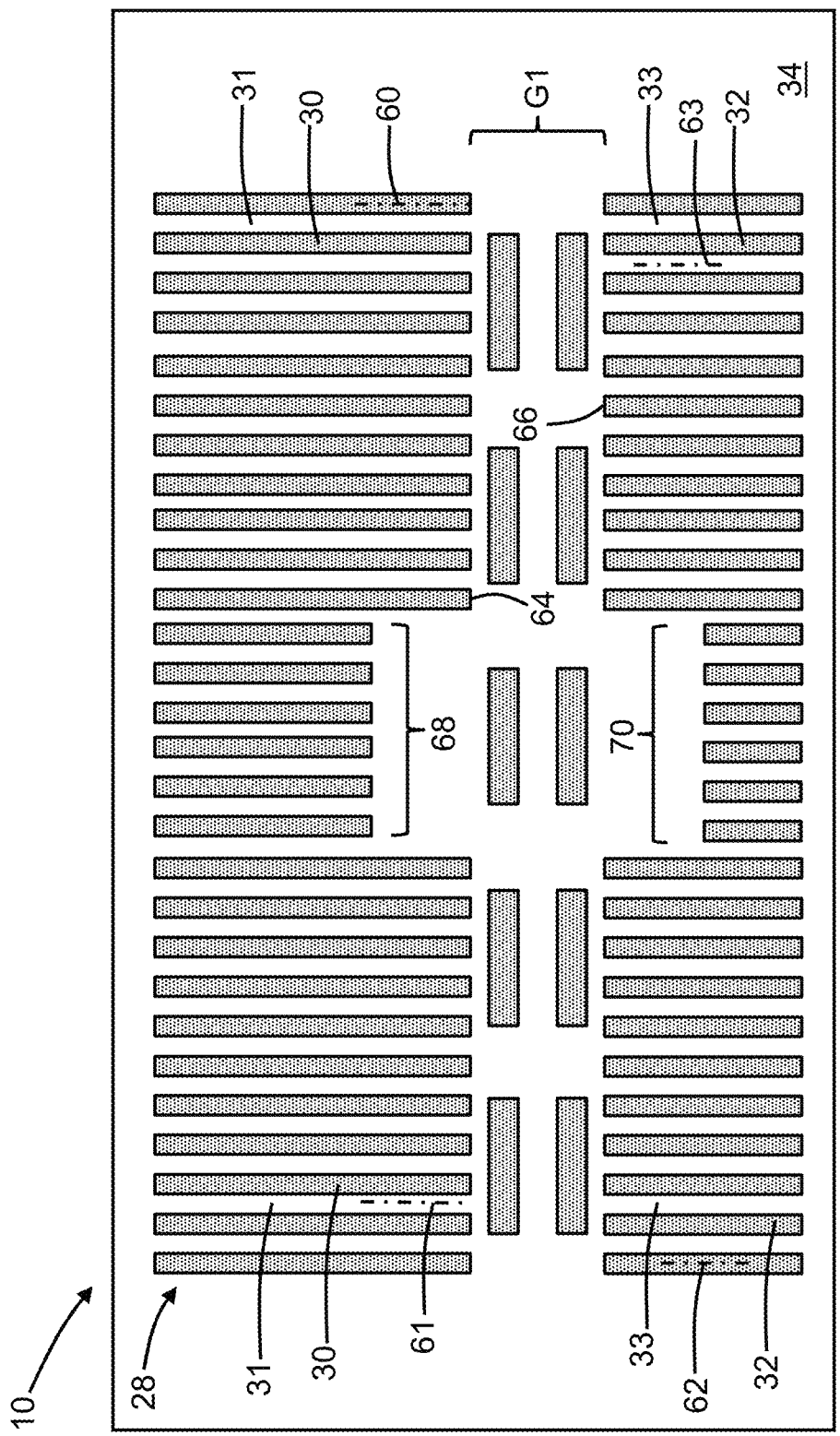
FIG. 9 is a top view of a structure in accordance with alternative embodiments of the invention.

With reference to FIG. 9 and in accordance with alternative embodiments, the segments 30 in a group 68 may have a length that is shorter than the length of the adjacent segments 30 not belonging to the group 68. Similarly, the segments 32 in a group 70 may also have a length that is shorter than the length of the adjacent segments 32 not belonging to the group 70. The gap G1 has a varying width with position along the longitudinal axis 14 due to the variation in the length of the segments 30 and the variation in the length of the segments 32 (and relocation of some of the end surfaces 64, 66). The length variation of the segments 30, 32 may be used to provide exclusion regions for the metal pads belonging to one or more of the interconnections 36, 38. In an alternative embodiment, the segments 30 in the group 68 and/or the segments 32 in the group 70 may be omitted from the slotted shield 28.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may overlap if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a semiconductor substrate;
   a waveguide core on the semiconductor substrate, the waveguide core including a phase shifter; and
   an interconnect structure over the waveguide core and the semiconductor substrate, the interconnect structure including a first plurality of interconnections, a first slotted shield, a first transmission line coupled to the phase shifter, and a second transmission line coupled to the phase shifter, the first transmission line laterally spaced from the second transmission line, the first slotted shield including a first plurality of segments, a first plurality of slots separating the first plurality of segments, a second plurality of segments, and a second plurality of slots separating the second plurality of segments, and the first plurality of segments of the first slotted shield positioned between the first transmission line and the semiconductor substrate,
   wherein the first plurality of segments and the second plurality of segments are disposed on opposite side edges of the waveguide core, and a first minimum distance between the first plurality of segments and the second plurality of segments is less than a second minimum distance between the first transmission line and the second transmission line.

2. The structure of claim 1 wherein the phase shifter includes a first doped region having n-type conductivity, a second doped region having p-type conductivity, and a junction.

3. The structure of claim 1 wherein each of the first plurality of segments has a line width, and each of the first plurality of slots has a width dimension that is equal to the line width.

4. The structure of claim 1 wherein the first transmission line is aligned along a first longitudinal axis, and each of the first plurality of segments is aligned along a second longitudinal axis that is inclined relative to the first longitudinal axis at an angle within a range of 45° to 90°.

5. The structure of claim 1 wherein the first transmission line is aligned along a first longitudinal axis, and each of the first plurality of segments is aligned along a second longitudinal axis that is perpendicular to the first longitudinal axis.

6. The structure of claim 1 wherein the second plurality of segments of the first slotted shield are positioned between the second transmission line and the semiconductor substrate, the first plurality of segments are spaced from the second plurality of segments by a gap, and the gap is positioned over the waveguide core.

7. The structure of claim 6 wherein the gap has a first edge and a second edge located across the gap from the first edge, the first plurality of segments terminate adjacent to the first edge, and the second plurality of segments terminate adjacent to the second edge.

8. The structure of claim 6 wherein the phase shifter includes a first doped region and a second doped region having an opposite conductivity type from the first doped region, the interconnect structure includes a third interconnection extending through the gap from the first doped region of the waveguide core to the first transmission line, and the interconnect structure includes a fourth interconnection extending through the gap from the second doped region of the waveguide core to the second transmission line.

9. The structure of claim 8 wherein the first transmission line is laterally offset by the third interconnection relative to the gap, and the second transmission line is laterally offset by the fourth interconnection relative to the gap.

10. The structure of claim 9 wherein the first transmission line overlaps with the first plurality of segments and the first plurality of slots, and the second transmission line overlaps with the second plurality of segments and the second plurality of slots.

11. The structure of claim 1 wherein the second plurality of segments of the first slotted shield are positioned between the second transmission line and the semiconductor substrate.

12. The structure of claim 11 wherein the interconnect structure includes a third transmission line laterally spaced from the second transmission line, and the second plurality of segments are further positioned between the third transmission line and the semiconductor substrate.

13. The structure of claim 12 wherein the interconnect structure includes a second plurality of interconnections that connect the third transmission line with the second plurality of segments of the first slotted shield.

14. The structure of claim 1 wherein the interconnect structure includes a second slotted shield positioned between the first slotted shield and the first transmission line.

15. The structure of claim 14 wherein the second slotted shield has a third plurality of segments and a third plurality of slots laterally separating the third plurality of segments, the third plurality of segments are positioned between the first transmission line and the first plurality of segments of the first slotted shield, and the third plurality of segments are staggered relative to the first plurality of segments.

16. The structure of claim 1 wherein the interconnect structure includes a first wiring level and a second wiring level, the first wiring level includes the first slotted shield, the second wiring level includes the first transmission line, and the first wiring level is closer to the semiconductor substrate than the second wiring level.

17. The structure of claim 1 wherein the first transmission line is coupled to ground, and further comprising:
a signal source coupled to the second transmission line.

18. A method comprising:
forming a waveguide core on a semiconductor substrate, wherein the waveguide core includes a phase shifter;
forming a slotted shield in an interconnect structure that is located over the waveguide core and the semiconductor substrate, wherein the slotted shield includes a first plurality of segments, a first plurality of slots separating the first plurality of segments, a second plurality of segments, and a second plurality of slots separating the second plurality of segments;
forming a first transmission line in the interconnect structure, wherein the first plurality of segments of the slotted shield are positioned between the first transmission line and the semiconductor substrate;
forming a second transmission line in the interconnect structure that is laterally spaced from the first transmission line; and
forming a plurality of interconnections that connect the first transmission line with the first plurality of segments,
wherein the first plurality of segments are positioned between the first transmission line and the semiconductor substrate, the first plurality of segments and the second plurality of segments are disposed on opposite side edges of the waveguide core, and a first minimum distance between the first plurality of segments and the second plurality of segments is less than a second minimum distance between the first transmission line and the second transmission line.

19. The method of claim 18 wherein the first plurality of segments are spaced from the second plurality of segments by a gap, and the gap is positioned over the waveguide core.

20. The method of claim 19 wherein the phase shifter includes a first doped region and a second doped region having an opposite conductivity type from the first doped region, and further comprising:
forming a first interconnection in the interconnect structure that extends through the gap from the first doped region of the waveguide core to the first transmission line; and
forming a second interconnection in the interconnect structure that extends through the gap from the second doped region of the waveguide core to the second transmission line.

* * * * *